March 15, 1949.  D. BUSHBY  2,464,554
PISTON AND EXPANSION MEANS THEREFOR
Filed Aug. 11, 1944  4 Sheets-Sheet 1

INVENTOR
David Bushby
BY
Blair, Curtis + Hayward
ATTORNEYS

March 15, 1949. D. BUSHBY 2,464,554
PISTON AND EXPANSION MEANS THEREFOR
Filed Aug. 11, 1944 4 Sheets-Sheet 3

INVENTOR
David Bushby
BY
Blair, Curtis + Hayward
ATTORNEYS

Patented Mar. 15, 1949

2,464,554

UNITED STATES PATENT OFFICE 2,464,554

PISTON AND EXPANSION MEANS THEREFOR

David Bushby, Regina, Saskatchewan, Canada, assignor to The Vacuum Air Pressure Company Limited, Regina, Saskatchewan, Canada, a corporation of Canada Application August 11, 1944, Serial No. 548,990

31 Claims. (Cl. 309—12)

The present invention relates to an improvement in pistons. Pistons of conventional or known types are commonly constructed to provide, when assembled in a cylinder, little if any initial contact other than that of the rings; and such contact occurs only along the thrust faces or in the thrust plane of the piston and none along the intermediate faces. Even where a new piston of conventional type has portions of sufficiently flexible construction to be assembled with any part of its thrust faces contacting the cylinder wall, the contacting parts are soon worn and the piston then lacks any adequate or effective circumferential support in the cylinder. The undesirable results of this condition are well known, both as they affect operation of the engine and as they present problems and involve expense in refitting, expanding or oversizing.

One object of my invention has been to provide a piston of relatively simple construction and one which, when first assembled with a cylinder, can be accurately and effectively adjusted thereto. A further object has been to provide a piston arranged and adapted to engage the cylinder in such a manner as to function efficiently and avoid wobble under all conditions of operation, to minimize the rate of wear of the interengaging parts, and to compensate for such wear over an extended initial period of use.

A further object of my invention has been to provide a piston construction, including a head and a skirt portion, wherein yielding parts of the skirt normally engage the cylinder wall snugly or without clearance while other parts are slightly spaced therefrom so that the piston is supported circumferentially and at spaced intervals in the cylinder and the piston skirt cannot seize or stick in the cylinder.

A further object has been to provide a piston having an adjustably expansible skirt portion which may be made integral with the piston head; or the skirt may be made separately therefrom and thereafter secured to the head to form a composite piston and skirt assembly.

A further object has been to provide simple and effective skirt adjusting or expanding devices adapted for use with piston assemblies, whether of the integral or composite type.

A further object has been to provide a piston skirt construction wherein relatively resilient or yieldable cylinder engaging portions are combined with more rigid portions normally not engaging the cylinder and having reinforcing means to furnish added mass and stamina to the parts where required for durability and more economical and effective operation.

A further object has been to provide a piston having cylinder engaging parts which, after becoming worn by use, can be readily adjusted to re-establish effective piston-cylinder engagement, and to provide means for releasably securing said parts in such engagement.

A further object has been to provide skirt expanding or oversizing means whereby the proper extent of correction can be made by adjusting the parts and securing them in adjusted position without throwing the piston out of accurate coaxial alignment with the cylinder bore.

It is contemplated that such adjustments may be made quickly and accurately with the piston remaining in the cylinder by the manipulation of devices carried in part by or forming part of the piston as initially assembled.

Other objects and advantages inherent in my invention will be apparent from the following description of an embodiment thereof and the appended drawings wherein—

Figure 1:
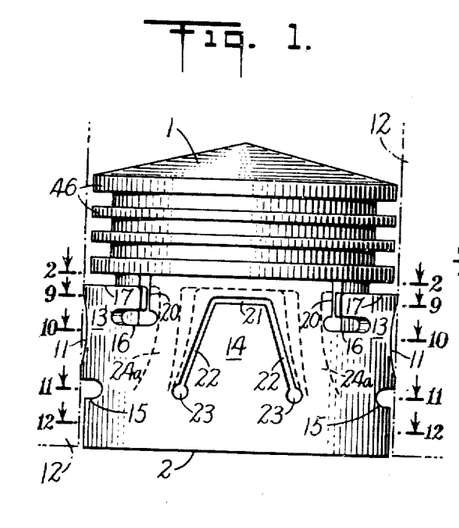
Figure 1 is a view in elevation of the thrust plate side of a composite piston head and skirt assembly in position in an engine cylinder.
Figure 5:
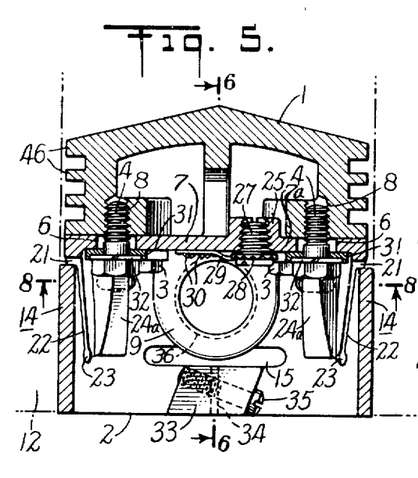
Figure 5, a central vertical section through the piston assembly on the line 5—5 of Figure 2.
Figure 6:
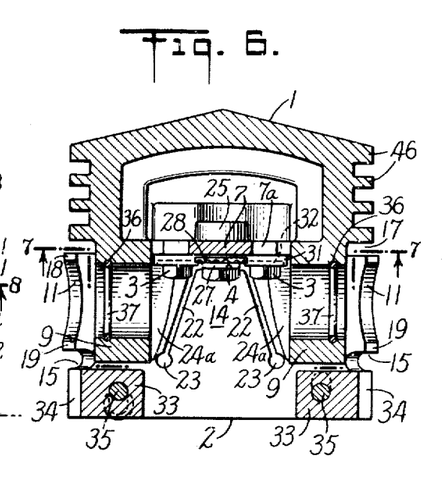
Figure 6, a central vertical section on the line 6—6 of Figures 2 and 5.
Figure 7:
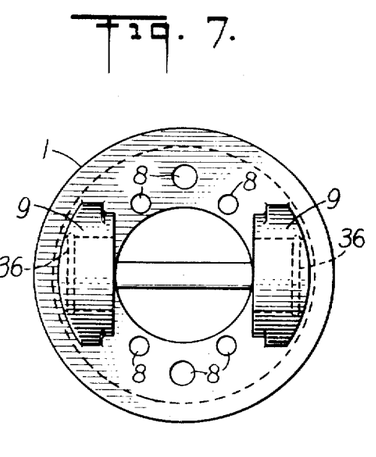
Figure 7, a view from the line 7—7 of Figure 6 illustrating inner end construction of piston head to which a separately formed skirt is attached to form a composite piston head and skirt assembly.
Figure 14:
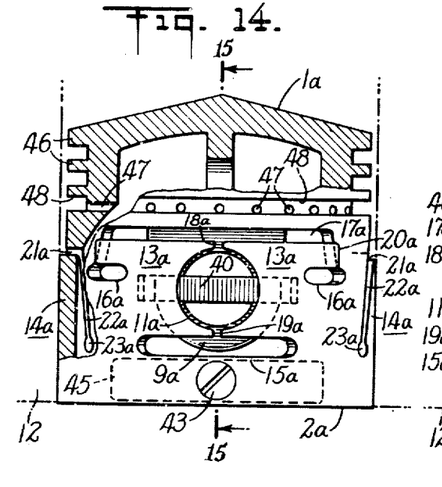
Figure 14, a side elevation with parts in central vertical section of a modification illustrating the wing side of an integral type piston head and a skirt mounted in an engine cylinder.
Figure 15:
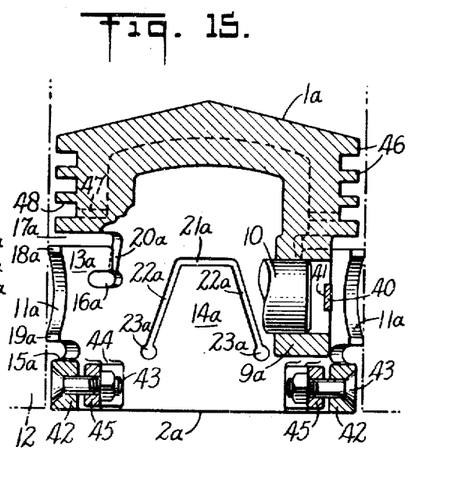
Figure 15, a vertical section on the line 15—15 of Figure 14 and with parts broken away to reveal underlying parts.

Referring to the drawings, a piston according to my invention comprises a head and a skirt, shown in Figures 1, 5 and 6 as separately formed parts, 1 and 2, respectively, and in Figures 14 and 15, as integrally formed parts 1a and 2a, respectively. In the composite piston, skirt 2 is secured to head 1 by suitable means, as bolts 3 and 4, and is adjustable thereon, in a manner and for a purpose to be explained. Bolts 3 extend through bolt slots 5 and bolts 4 through bolt slots 6 in a divided cross plate 7, 7a, Figure 2, at the head engaging end of skirt 2 and into bolt holes 8, Figure 7, in head 1.

Heads 1 and 1a have ring lands 46 and are provided with bosses 9, 9a respectively, having openings to receive a wrist pin 10. Said openings are formed with annular grooves 36 arranged and adapted to receive wrist pin retaining springs 37. Head 1a also has oil draining holes 47 opening through its wall from the oil ring groove 48.

Skirts 2 and 2a have circular openings 11, 11a respectively, opposite the openings in bosses 9, 9a and through which the wrist pins 10 and retaining springs 37 may be inserted and removed.

To provide the desired resilience or flexibility for effective operation of the piston, whether of the composite type or the integral type, when assembled in a cylinder, as 12, indicated in broken lines, Figures 1, 5, 14 and others, the skirt has relatively rigid portions and relatively flexible or yielding portions. The latter are distributed symmetrically, or are arranged in a manner to provide in effect suitably disposed yielding cylinder engaging bearing surfaces which maintain the piston in effective concentric or co-axial relation to the cylinder.

Means are also provided for "over-sizing," adjusting, or repositioning said flexible portions to compensate for wear of the bearing surfaces thereof, the cylinder surfaces engaged thereby, or both.

Figure 3:
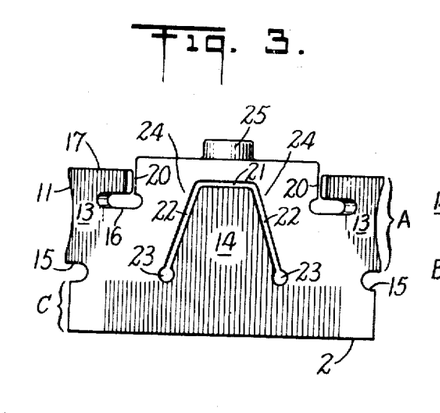
Figure 3, a view in elevation of the thrust plate side of the skirt shown in Figure 1, with the relatively extended or cylinder contacting portions of the outer surface of said skirt lined vertically and the less extended or free surfaces thereof unlined.
Figure 4:
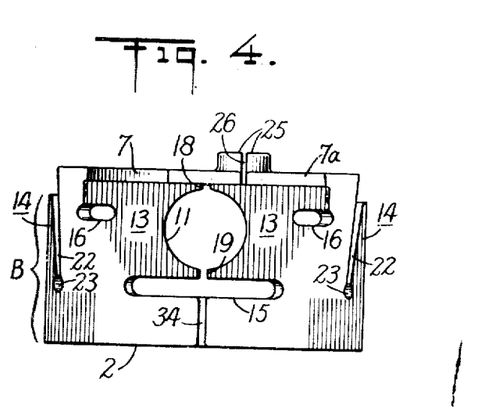
Figure 4, a view in elevation of the wing side of said skirt with the cylinder contacting portions of the outer surface of said skirt lined vertically and the free surfaces thereof unlined.

As seen more clearly in Figures 3 and 4, the flexible or yielding cylinder engaging portions of skirt 2 of the composite piston there shown include wings 13 and one or more thrust members 14. The vertically lined surface portions of said figures indicate approximately those areas of and adjacent to said wings and said thrust members which are relatively extended in a radial sense and bear yieldingly against the cylinder when the piston is operatively assembled therein. The unlined portions are rigid and less extended radially; and do not bear against the cylinder when in assembled position.

*Wing construction—composite piston*

As seen in Figures 1, 3 and 4, said wings 13 are defined by edge portions of the circular openings 11, Figure 4, the long circumferential slots 15, the short circumferential slots 16, the circumferential gaps 17 forming, in effect, slots between head 1 and skirt 2, Figure 1, the longitudinal slots 18, 19, Figure 4, and the longitudinal slots 20, Figure 3.

Each of said longitudinal slots 18 connects a circumferential gap or slot 17 with a circular opening 11; and each longitudinal slot 19 connects a circumferential slot 15 with a circular opening 11. Each longitudinal slot 20 connects a short circumferential slot 16 with a circumferential gap or slot 17.

It will be apparent from Figures 3 and 4, considered in connection with the above description, that where the skirt 2 is formed of steel or other suitable metal having a resilient or springy quality, said wings 13 will be capable of a certain flexing or spring-like movement in relation to adjacent relatively more rigid and less extended portions of said skirt 2. Outer surface portions of said wings are therefore advantageously brought into yielding contact with the cylinder bore when the piston is operatively assembled therein.

*Thrust member construction—composite piston*

As appears more clearly from Figures 1, 3 and 4, a thrust member or yielding bearing portion 14 of the skirt is defined by a circumferential slot 21 and a pair of obliquely disposed longitudinal slots 22, each slightly enlarged at one end to form a hole 23. The circumferential slot 21 connects adjacent ends of said pair of oblique slots 22. It will be clear that, with the last described arrangement of slots 21 and 22, the thrust member 14 so defined is capable of a certain flexing or spring-like movement in relation to adjacent portions of skirt 2 and yielding movement in relation to a cylinder bore when the piston is operatively assembled therein. In some cases, the skirt includes two diametrically opposed thrust members 14. In other cases, as where maximum strength is needed in the skirt, a single thrust member only is provided.

*Skirt reinforcing ribs*

Figure 9:
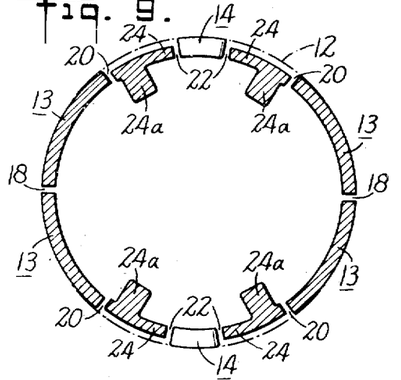
Figure 9, a transverse horizontal section on the line 9—9 of Figure 1.
Figure 10:
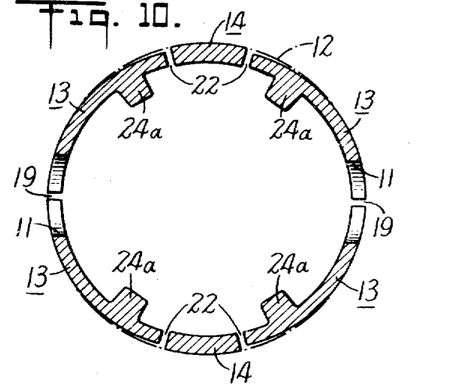
Figure 10, a transverse horizontal section on the line 10—10 of Figure 1.
Figure 11:
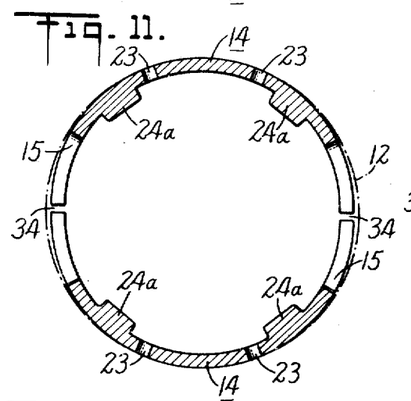
Figure 11, a transverse horizontal section on the line 11—11 of Figure 1.

Greater rigidity of the less extended wall portions 24 lying between or adjacent to the more flexible or springy wings 13 and one or more thrust members 14, is provided in the illustrated embodiment by reinforcing ribs 24a, Figures 5, 9, 10 and 11, extending from the head or upper end of skirt 2, as seen in Figure 1, for example, part way to the open or lower end thereof. As seen in Figures 9, 10 and 11, said skirt reinforcing ribs 24a flare or increase in circumferential width and taper or diminish in radial thickness from their head ends toward their opposite ends.

Skirt construction of integral piston

In the embodiment of an integral type of piston, as shown in Figures 14 to 17 inclusive, the skirt portion 2a provides, in effect, symmetrically arranged yielding cylinder engaging bearing surfaces corresponding in function to those of the above described wings 13 and thrust members 14 of the composite piston. Thus, wings 13a, Figures 14, 15, are defined by edge portions of the circular openings 11a, the longer circumferential slots 15a, the short circumferential slots 16a, the longest circumferential slots 17a, the longitudinal slots 18a, 19a, and the longitudinal slots 20a.

Each thrust member, as 14a, Figures 14 and 15, is defined by edge portions of connected slots including a slot 21a which extends circumferentially and connects with end portions of oblique longitudinal slots 22a enlarged at their closed or lower ends to form holes 23a.

Symmetrical arrangement of bearing surfaces

In stating above that the wings, as 13, 13a, and the thrust portions, as 14, 14a, may be distributed or arranged "symmetrically," their positions in relation to the central longitudinal axis of the piston and median planes passing through said axis are referred to. For example, as seen in Figures 3, 4, 9, 10, 14 and 15, the thrust portions 14, 14a where two are used, are positioned diametrically opposite each other and equi-distant from a vertical median axial plane, conveniently referred to as the transverse median axial plane of the piston. The wings 13, 13a occur in pairs, one pair being at each side of another vertical median axial plane perpendicular to said transverse plane, and with a wing of one pair diametrically opposite a wing of the opposite pair. Said other vertical median axial plane may conveniently be referred to as the "thrust plane" of the piston. Stated differently, the thrust portions 14, 14a are operative in the direction of the thrust plane; and each wing 13, 13a is operative at one side of the transverse plane, inasmuch as the latter passes centrally through the slots 18, 18a, 19, 19a, and 24, Figures 4, 10 and 14.

Other important relative positions of the wings and thrust members appear from said figures. Thus, the bearing surfaces of wings 13, 13a occur in spaced portions of a peripheral zone extending from the head end of skirt 2, in part to slots 16, 16a, and in part to slots 15, 15a therein, the longitudinal extent of said zone being indicated generally at A, Figure 3.

The bearing surfaces of thrust members 14, 14a occur in spaced portions of a peripheral zone extending from the open (lower as seen in Figure 4) end of skirt 2, 2a in part to the openings 23, 23a, and in part to the circumferential slots 21, 21a, the longitudinal extent of said zone being indicated generally at B, Figure 4.

It appears also from Figures 3, 4, 14 and 15, that portions of the bearing surfaces of said wings lie between circumferentially opposed portions of the bearing surfaces of said thrust members, and that laterally disposed areas of said wing surfaces lie longitudinally opposite laterally disposed areas of said thrust member surfaces. Stated differently, the relatively extended wings and thrust members are so arranged that bearing surfaces of one are spaced from (by adjacent free or relatively less extended surfaces) and overlap bearing surfaces of the other, both circumferentially of the skirt and longitudinally thereof.

Construction of separate skirt

In the composite form of piston, Figures 3 to 7 inclusive, for example, the end plates 7, 7a forming part of skirt 2, are initially cast therewith as an undivided or continuous plate or cross bar provided with a boss 25, Figure 4. A transverse slot 26 cut centrally through said boss 25 separates plate portion 7 from plate portion 7a. Said boss 25 is also drilled and threaded to receive a tapered expanding screw 27, Figure 5, having a dial head provided with radial notches 28. A lock spring 29, Figure 8, is secured to plate 7, by screws 30 and has its tapered free end positioned to yieldingly engage said notches 28, so that when screw 27 is turned, as hereinafter described, said free end will readily ride over the ridges between said notches.

Figure 2:
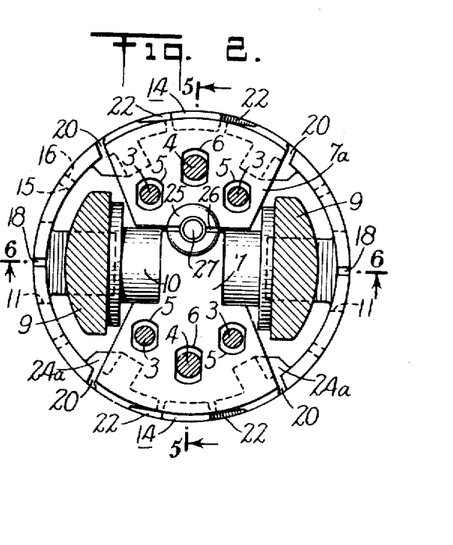
Figure 2, a view in horizontal section on the line 2—2 of Figure 1 showing the top or head end of the skirt member of the piston assembly in condition as initially mounted in an engine cylinder and with fastening and adjusting bolts in place.

As seen more clearly in Figure 2, the bolt slots 6 in cross plates 7, 7a are arranged with their central longitudinal axes aligned with the axes of expanding screw 27 and of the piston skirt as a whole. The bolts 4 are sized to a sliding fit in said slots 6. Thus, when the piston is initially fitted to a cylinder, or when oversizing by extending the wing members 13, as described later, the outward or adjusting movements for this purpose of plates 7, 7a will be accurately guided by said bolts 4 in diametrically opposite directions and with no angular distortion.

Securing skirt to head

Figure 8:
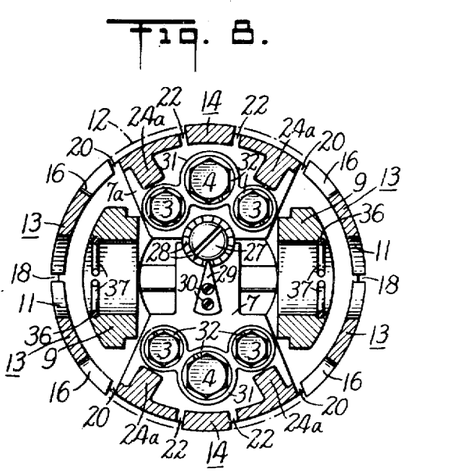
Figure 8, a transverse horizontal section on the line 8—8 of Figure 5.

Referring now to Figure 8, when the plates 7, 7a have been adjusted to any predetermined initial position, or to a desired oversizing position to extend wing members 13, said plates are clamped or locked in that position by tightening the bolts 3 and 4 into the bolt holes 8 in head 1. The lock washer retainers or plates 31, Figure 8, are recessed to receive spring lock washers 32, operatively engaging the heads of said bolts 3 and 4 to maintain said bolts in locking or clamping position regardless of jarring, vibration, or temperature changes.

Thrust expansion and clamp therefor

Figure 12:
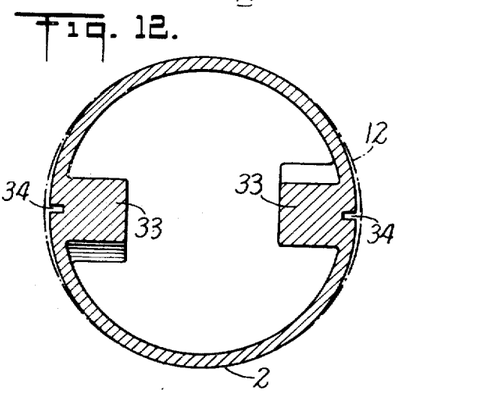
Figure 12, a transverse horizontal section on the line 12—12 of Figure 1.
Figure 13:
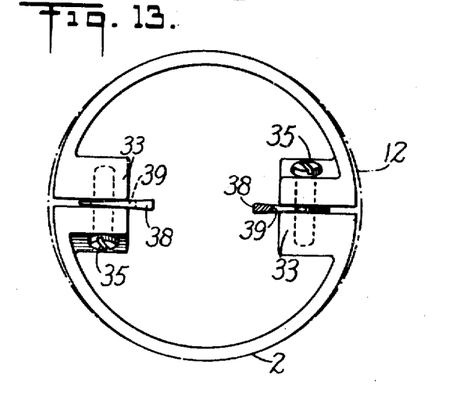
Figure 13, a bottom plan view of the piston skirt, as shown in Figure 12, modified by extending the slot through the bolt lugs to divide the skirt into two parts; and showing use of shims inserted between said parts after thrust faces have been worn and bolts clamping said shims and the parts in operative relation.

As seen more clearly in Figures 5, 6 and 12, lugs 33 extend inwardly toward each other from portions of the skirt wall at its open end. Prior to initial assembly of a composite piston with a cylinder, as 12, longitudinal grooves 34 of a depth approximating the normal thickness of adjacent portions of the skirt wall and extending from slots 15 to the free end edge of skirt 2 are cut in a portion of the outer surface thereof adjacent to said lugs 33. Said grooves 34 may later be extended entirely through lugs 33 and thus divide skirt 2 into separate parts to condition the skirt for oversizing of the thrust sections in a manner to be explained. Said lugs are also provided, for this ultimate purpose, with bolt holes having portions threaded to receive bolts 35, said holes and said bolts being preferably arranged at an angle to the plane of the adjacent edge of the skirt so that the bolt head may be reached and effectively turned by means of a tool applied thereto when the piston is assembled in a cylinder, as shown in Figure 5, for example. Said bolts are usefully employed in connection with other devices to be described after grooves 34 have been extended, to lock or clamp the thrust member carrying parts in their new position of adjustment in relation to the cylinder bore, as seen in Figure 13, for example.

The skirt casting

Skirt 2 is initially cast in a generally cylindrical form with cross plates 7, 7a forming a continuous end piece. The skirt is irregular at portions of its outer surface to the extent that moderately recessed or unextended areas corresponding in general to the unlined portions of the surface of the skirt occur above and at both sides of the more extended thrust members, and as shown in Figures 3 and 4. Thus the normal thickness of the skirt wall, as 24, and not including the thickness of reinforcing members in these areas is less than the thickness of the adjacent thrust members, Figures 9 and 10; but sufficient rigidity is supplied at the desired areas by the reinforcing ribs 24a, previously described.

Machining of cross plates

In a typical embodiment of a skirt for a composite piston, the cross plate 7, 7a at the head end of the skirt casting, as initially formed, is machined accurately to bring its outer surface into a plane normal to the skirt axis, or to the direction of linear movement of the skirt in a cylinder. The dividing slot 26 and the bolt slots 5 and 6 are machined out of said cross plate; the hole for screw 27 is drilled; and the skirt 2 is then connected to head 1 by the bolts 3 and 4 passing through said slots, as previously pointed out.

Machining piston head

Thereafter, if the piston is intended to fit and work in a three inch cylinder bore, for example, peripheral portions of the head 1 including the ring lands are turned to a diameter of 2.98 inches, leaving a clearance of .01 of an inch between said peripheral surfaces of the piston head and the cylinder wall. It will be understood that the above and any subsequently mentioned dimensions of the parts involved are illustrative only and are not intended to indicate any limitation of the invention in respect thereto.

Surface machining the skirt wall

The extended or unrecessed portions of skirt 2 included in zone A, i. e., portions of thrust plate 14, Figure 3, and the wings 13, Figure 4, are then turned to an outward diameter of 2.999 inches, leaving only a minute initial clearance of the bearing surfaces with the cylinder bore in said zone A. The remaining outer peripheral surface of the skirt, indicated as zone C, Figure 3, is cam ground to an elliptical contour of three inches across its major axis, which coincides with the thrust axis, and 2.98 inches across its minor axis. This leaves a clearance of approximately .01 inches between those portions of zone C adjacent grooves 34 shown as unshaded in Figures 3 and 4, and the cylinder wall, said clearance being shown in exaggerated degree in Figures 11 and 12, wherein the broken line indicates the bore of the cylinder 12.

Cutting openings in skirt wall

After said surface machining is completed, the various wing and thrust member defining holes and slots aforesaid and the grooves 34 are cut into the skirt 2 which is now ready for initial assembly with a cylinder, as 12.

With the skirt 2 and parts as above described properly connected to head 1 and with wrist pin 10 in place to connect the piston to the engine rocker arm (not shown), the composite piston is ready to be assembled in a cylinder. The initial contacts and clearances of various portions of the skirt surface in relation to the cylinder bore are indicated in exaggerated degree in Figures 9 to 12 inclusive wherein the circle 12 in broken lines represents the bore of a cylinder.

Figures 9 and 10, which are sections in zone A, show that wings 13 and thrust faces 14 are relatively extended to bear yieldingly against portions of the cylinder surface, whereas intervening portions of skirt 2, i. e. those relatively recessed or less extended portions outwardly adjacent to ribs 24a, are arranged to leave a substantial clearance between their outer surfaces and the cylinder surface. As previously explained, zone A has been machined to within .001 of an inch of the inside diameter of the cylinder bore. A slight turn of expansion screw 27 will, therefore, bring face portions of wing members 13 into contact with the cylinder, leaving the adjacent surfaces of the skirt slightly cleared therefrom. Said cleared or nonengaging spaces or surfaces are included in the unlined areas in zone A, Figures 3 and 4.

Figures 11 and 12 which are sections in zone C, Figure 3, show that portions of said zone below said thrust members are relatively extended to bear against portions of the cylinder; but that portions of said zone below slots 15 (as seen in Figures 3 and 4) are recessed or less extended to leave a clearance between their outer surfaces and the cylinder bore. As previously explained in connection with a specific example, in grinding or contouring zone C, the major or thrust axis is three inches, whereas the clearance portions are cam ground to a shorter cross axial dimension.

It is apparent from said Figures 3 and 4 and 9 to 12 inclusive that in zone A the skirt presents major diametric dimensions and therefore cylinder contacting surfaces in both axes; whereas in zone C, the major dimension is reached only in the thrust axis. Stated differently, the thrust surfaces engaging the cylinder have a greater longitudinal dimension than the wing surfaces. Inasmuch as the thrust faces are subjected to greater wearing forces in their contact with the cylinder bore, it is contemplated that the arrangement above described provides in part a more stable and effective means to prevent or postpone rocking or lost motion of the piston in the thrust plane.

Oversizing composite piston

After the cylinder and/or the wing and thrust portions of the skirt have been worn down by use, sufficiently to require adjustments or oversizing, the piston assembly is first withdrawn from the cylinder bore and bolts 35 are removed. Groove 34, Figure 12, is extended inwardly through the lugs 33 to cut them into two parts. Shims 38 provided with longitudinal slots 39, Figure 13, are then positioned between said parts as shown; and bolts 35 are reassembled in slightly slacked off relation with lugs 33 and pass through said slots 39 in shims 38.

The piston assembly is returned to a position in the cylinder, Figure 5, for example, wherein the expansion screw 27, the shims 38, and bolt 35 may be actuated by proper tools manipulated from outside the cylinder.

Bolts 3 and 4 are first loosened; and then expanding screw 27 is turned in a direction to move plates 7 and 7a apart and so that portions of the wing faces 13 are thereby repositioned to yieldingly engage the cylinder bore in the desired manner.

It is usually advantageous to effect oversizing of the thrust members as nearly as possible along with oversizing of the wings. Thus, in a typical case, screw 27 is turned through a short angle and then wedging shims 38 are tapped to move outwardly and thus spread the lower or open end portions of skirt 2 farther apart. Driving of the shims has the effect of moving portions of the thrust member faces toward parts of the cylinder wall, while the turning of screw 27 advances portions of the wing faces toward other parts of the cylinder wall. These corrective operations are repeated until the desired contact relation of the wing and thrust members with the cylinder has been achieved. Thereupon, bolts 3 and 4 are tightened to secure the wings in oversized position; and bolts 34 are tightened to secure the thrust members in oversized position.

Subsequent oversizings may be effected without removing the piston from the cylinder bore merely by slacking said bolts and repeating the screw turning and shim advancing operations above described.

It will be understood that while over-sizing the wing and thrust portions of the skirt of a piston, suitable guage devices (not shown) are properly placed between portions of the head, as the ring lands, and adjacent surfaces of the cylinder wall to hold the head accurately centered in the cylinder. Other suitable guage devices (not shown) are also inserted between those portions of the skirt wall adjacent to the outer end of groove 34, as extended to cut through the lugs 33, and the cylinder wall to maintain a predetermined clearance while the thrust members are being shimmed up into proper relation to the cylinder wall. All guages remain in place until the shims or wedges 38 have been clamped in place by bolts 35 and the bolts 3 and 4 are tightened up, as above described.

When the guages are removed after the above described operations, the piston will be correctly oversized so that the wings 13 and the thrust members 14 and that portion of the skirt below said thrust members, as seen in Figures 3 and 4 will be in yielding contact with the cylinder wall.

*Wing and thrust plate contact adjustment in integral type piston*

Where the head and skirt are cast in a single piece, as shown in Figures 14 and 15, oversizing procedure may vary in some respects from that above described in relation to the composite type piston. Thus the wings 13a are normally expanded outwardly to an extent necessary for initial assembly in a cylinder by expander springs 40. These are interposed between the skirt wall and adjacent outer faces of the pin bosses 9a and engage and are held in position by grooves 41 in said outer faces of said bosses 9a.

Figure 16:
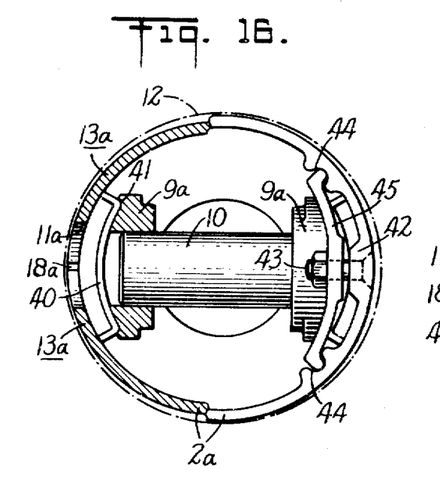
Figure 16, a bottom plan view of the modified structure of Figure 14 with wing and thrust plate portions worn to an extent to be out of engagement with the cylinder wall, and including removable and interchangeable wing and thrust plate expanders, before adjustment or refitting a cylinder.
Figure 17:
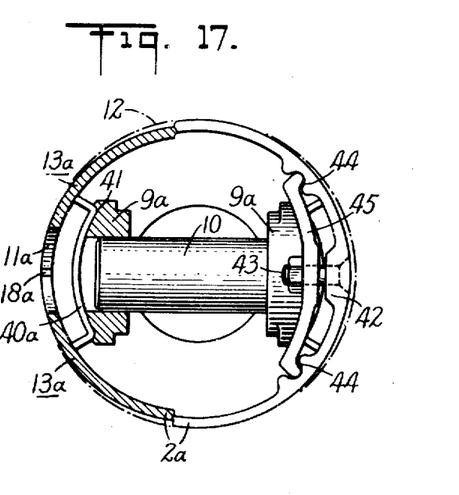
Figure 17, a bottom plan view of the modified structure with parts worn as shown in Figure 16 and after replacement of the removable wing expanders and repositioning of the thrust plate expanding devices to re-establish effective yielding engagement of said wings and said thrust plates with the cylinder wall.

When the wings become worn, as indicated in Figure 16 by the exaggerated showing of clearance between portions of wings 13a and adjacent cylinder surfaces, the original expander springs 40 are removed and are replaced by stronger or stiffer expander springs, as 40a, Figure 17, so that the wings 13a are again forced outwardly into proper yielding contact with the cylinder wall.

The skirt of the integral piston may have the split type open end construction, as shown in Figures 12 and 13 for example; or it may have the modified or continuous form shown in Figures 14 to 17 inclusive.

If the piston skirt is of the split type, the operation of oversizing the thrust members 14a substantially parallels the procedure above set forth regarding the oversizing of thrust plates 14 of the composite piston construction.

If the skirt of the integral piston is of the modified or continuous type shown in Figures 14 to 17 inclusive, inwardly extending reinforcing bosses 42 are provided with bolt holes to receive bolts 43. At each side of said bosses 42 are sockets 44 in the skirt wall arranged and adapted to receive the tip end portions of expander bridges 45, each having a central threaded opening.

The piston is originally assembled in the cylinder, as 12, with bolts 43 holding bridges 45 under sufficient tension to bring lower end surface portions of the skirt in and at each side of the thrust axis and the outer faces of the thrust members 14a into the desired yielding engagement with the cylinder wall. Undue clearance, as indicated in exaggerated degree in Figure 16, between said faces and said cylinder wall develops with wear and is eliminated by tightening up on the bolts 43 sufficiently to re-expand or extend said faces outwardly in and near the thrust axis to the operative cylinder engaging position shown in Figure 17.

I claim:

1. A piston having a skirt open at one end and provided with a transverse wall at the other end comprising outwardly extended resilient cylinder engaging portions interposed between relatively unextended and more rigid portions and interiorly arranged reinforcing ribs projecting inwardly from said unextended more rigid portions and connecting said more rigid portions to said transverse wall.

2. A piston having a skirt comprising outwardly extended resilient cylinder engaging portions interposed between relatively unextended portions and interiorly arranged reinforcing ribs projecting inwardly from said unextended portions, said ribs being of diminishing thickness from one end thereof toward the other.

3. A piston having a skirt comprising outwardly extended resilient cylinder engaging portions interposed between relatively unextended portions and interiorly arranged reinforcing ribs extending inwardly from said unextended portions, said ribs being of diminishing thickness and increasing width from one end thereof toward the other.

4. A piston having a skirt provided with cuts arranged to form sets of spaced resilient relatively extended cylinder engaging members of which those of one set are spaced from those of another set by relatively less extended areas of said skirt, one of said sets having portions located at one end of said skirt and another set being at the other end thereof, and said sets being arranged with said portions of one set longitudinally spaced from and overlapping said portions of the other, and with intermediate portions of one set circumferentially spaced from intermediate portions of the other.

5. A piston having a skirt comprising a set of spaced resilient cylinder engaging thrust members and a set of wing members, the members of one set being positioned in circumferentially spaced relation to those of said other set, the members of said set of thrust members being arranged in diametrically opposed relation, and the members of said set of wing members being arranged in diametrically opposed relation and with their common median axial plane perpendicular to the common median axial plane of said thrust members, and each of said members of one set having portions longitudinally spaced from and in overlapping relation to portions of a member of the other set.

6. A piston having a skirt comprising sets of spaced resilient cylinder engaging members, one of said sets being operative in the median axial thrust plane of the skirt and the other set being operative in the direction of a plane perpendicular thereto and the members of one set having portions positioned in circumferentially spaced relation to those of another set, and other portions in longitudinally spaced relation to other portions of said other set, and separately operable means for repositioning said respective sets of members to extend them toward their cylinder engaging positions.

7. A piston having a skirt comprising diametrically opposed resilient thrust members and resilient wing members, all said members having relatively extended outer cylinder engaging surfaces extending beyond adjacent less extended surfaces of said skirt, and a reinforcing rib projecting inwardly from said less extended portion of said skirt and arranged between a resilient thrust member and a resilient wing member.

8. A piston having a skirt comprising diametrically opposed resilient thrust members and diametrically opposed resilient wing members, said thrust members presenting opposed cylinder engaging surfaces at one end and at longitudinally intermediate portions of said skirt and said wing members presenting opposed cylinder engaging surfaces at the opposite end and at other longitudinally intermediate portions of said skirt, said thrust members and said wing members being supported on and having their outer faces spaced apart by relatively rigid portions of said skirt which are out of engagement with the cylinder wall when the piston is mounted therein.

9. A piston skirt including an end plate extending across one end, opposed resilient cylinder engaging wing members operatively connected to opposite ends of said end plate, and means operatively connected with said end plate to reposition portions thereof and thereby to vary the position of said wing members.

10. A piston having a skirt including lugs extending inwardly from opposed portions of said skirt at one end thereof, outside surfaces of said portions being shaped to impart an elliptical cross-sectional contour to said skirt at a zone thereof which includes said opposed end portions, and means operatively connected with said lugs and arranged and adapted to vary the positions of said opposed portions and thereby to change said elliptical contour.

11. A piston having a skirt including at one end resilient cylinder engaging wall portions arranged and adapted to impart thereto an elliptical cross-sectional contour with its major axis disposed in one direction, and including at the opposite end other resilient cylinder engaging wall portions arranged and adapted to impart thereto an elliptical cross-sectional contour with its major axis disposed in a direction normal to that of said first mentioned cylinder engaging wall portions, and means operatively connected to said skirt for separately varying the cross-sectional contours of the several cylinder engaging portions at said respective ends of the skirt.

12. A piston skirt having longitudinal openings extending from one end thereof toward the opposite end, and circumferentially extending openings connecting with portions of said longitudinal openings, said longitudinal and circumferential openings being arranged and adapted to define a plurality of resilient wing members each disposed for yielding engagement with an engine cylinder when operatively assembled therein and positioned at one side of a median axial plane perpendicular to the plane of the thrust axis of the piston, and reinforcing ribs projecting inwardly from said skirt and extending longitudinally thereof in position to provide a relatively rigid wall portion at one side of each of said resilient wing members.

13. A piston skirt having openings extending longitudinally through intermediate parts of its peripheral wall and an opening extending circumferentially thereof and connecting portions of said first mentioned openings, said longitudinal and circumferential openings being arranged and adapted to define a resilient thrust member disposed for yielding engagement with an engine cylinder when operatively positioned therein, and reinforcing ribs projecting inwardly from said skirt and extending longitudinally thereof and in position to provide a relatively rigid wall portion at one side of each of said longitudinally extending openings.

14. A piston skirt having longitudinal openings extending from one end thereof toward the opposite end and circumferentially extending openings connecting with portions of said longitudinal openings to define wing members, other openings extending longitudinally through intermediate parts of said skirt between said wing members, and circumferentially extending openings connecting portions of said intermediately disposed longitudinal openings to define thrust members, said wing members and said thrust members being arranged and adapted to bear yieldingly against angularly spaced portions of an engine cylinder when operatively assembled therein, and a reinforcing rib projecting inwardly from said skirt and extending longitudinally thereof and positioned between each resilient wing member and the next adjacent resilient thrust member.

15. A piston comprising a head, a skirt having relatively rigid portions and angularly spaced relatively yielding cylinder engaging portions, means for releasably securing said skirt to the head, and means for repositioning some of said cylinder engaging portions in relation to the head to vary the yielding pressure of said portions on a cylinder when said piston is operatively positioned therein.

16. A piston comprising a head, a skirt releasably secured thereto at one end and having oppositely disposed openings extending from said head end edge thereof toward and to an extent short of the other end edge thereof, means for varying the extent of said openings at said head end edge, and means for releasably securing said skirt and said head together, with said openings at any predetermined extent of opening.

17. A piston comprising a head, a two part skirt having end portions of the parts thereof secured to said head, said parts being spaced apart to form oppositely disposed openings extending from the head end edge thereof through the opposite end edge, and means for releasably connecting adjacent portions of said opposite ends of said skirt parts.

18. A piston comprising a head, a two part skirt having end portions of the parts thereof secured to said head, said parts being spaced apart to form oppositely disposed openings extending from the head end edge thereof through the opposite end edge, means adjustably positioned in said openings at said opposite ends thereof to vary the spacing between said parts, and means for releasably securing said parts in any predetermined spaced relation.

19. A piston comprising a head, a two part skirt having end portions of the parts thereof secured to said head, said parts being spaced apart to form oppositely disposed openings extending from the head end edge thereof through the opposite end edge, a shim positioned in each of said openings at said opposite ends, and means for securing said end portions together to releasably clamp said shims between them.

20. A piston skirt having a resilient thrust portion arranged and adapted to engage an engine cylinder and portions normally out of engagement with said cylinder when operatively positioned therein, and means for varying the position of said thrust portion in one direction in relation to the cylinder and for simultaneously varying the position of the intermediate portion in another direction.

21. A piston skirt having oppositely disposed resilient thrust portions arranged and adapted to engage an engine cylinder and intermediate portions normally out of engagement with said cylinder when operatively positioned therein, and means including parts extending through said intermediate portions and parts bearing yieldingly on said thrust portions to vary the relative positions of said portions.

22. A piston having a skirt provided with a set of resilient cylinder engaging members extended to bear yieldingly against portions of a cylinder wall in the direction of the thrust plane of the piston and another set of resilient cylinder engaging members extended to bear yieldingly against other portions of said cylinder wall in a direction transversely of said thrust plane said skirt having a relatively rigid and less extended portion arranged between said resilient members, each resilient member of one of said sets of cylinder engaging members being connected to a resilient member of the other set through the said rigid and less extended portion of said skirt which, when the piston is assembled with a cylinder, is out of engagement with the cylinder wall.

23. A piston having a skirt and wrist pin bosses, said skirt being provided with wrist pin receiving openings therein each arranged opposite one of said bosses and at one side of the thrust plane of the piston, spaced longitudinal slots one at each side of said thrust plane, a circumferential slot extending across said thrust plane and connecting adjacent ends of said longitudinal slots to form a resilient thrust plate operative in the direction of said thrust plane, and a reinforcing rib projecting inwardly from and forming a relatively rigid portion of said skirt and extending longitudinally thereof between each of said wrist pin receiving openings and said resilient thrust plate.

24. A piston having a skirt and wrist pin bosses inside said skirt and spaced therefrom, said skirt being provided with wrist pin receiving openings therein each arranged opposite one of said bosses and at one side of the thrust plane of the piston, circumferentially extending slots spaced apart longitudinally of the skirt and connected with one of said wrist pin receiving openings by longitudinally extending slots, and circumferentially extending slots spaced apart circumferentially and disposed between said first mentioned circumferentially extending slots, and each connected to one thereof by a longitudinally extending slot, said slots and said wrist pin opening being arranged and adapted to define a resilient wing member at each side of said wrist pin opening and of a median plane normal to the thrust plane of the piston.

25. A piston having a head and a skirt, said skirt being provided with interiorly disposed spaced reinforcing ribs extending from the head end thereof toward the opposite end thereof, a thrust plate arranged in the thrust plane of the piston between adjacent ribs, and wing plates arranged between other adjacent ribs, outer surfaces of said thrust plates and said wing plates being extended outwardly toward cylinder engaging position, and outer surfaces of said skirt between said thrust and wing plates being relatively less extended to clear the cylinder bore when in operative position in a cylinder.

26. A piston having a skirt wall provided with spaced reinforced relatively rigid portions, resilient wing members, and resilient thrust members, defined in part by vertical and longitudinal slots cut through said wall between said rigid reinforced portions thereof, said resilient members being extended for yielding contact with a cylinder and said rigid portions being less extended to afford clearance between said outwardly exposed areas of said rigid portions and said cylinder when the piston is operatively positioned therein.

27. A piston having a head and a skirt comprising an approximately cylindrical wall, spaced reinforcing ribs projecting inwardly from said wall and extending longitudinally from the head end thereof toward the opposite end thereof, a pair of resilient wing members extending circumferentially toward each other from adjacent reinforcing ribs, and a resilient thrust member extending longitudinally of said skirt toward said head end thereof.

28. A piston having a skirt comprising relatively rigid wall portions having outer surfaces adapted to be out of contact with the cylinder wall when the piston is mounted in a cylinder, reinforcing ribs projecting inwardly from inner surfaces of said rigid wall, and relatively resilient wall portions having cylinder wall engaging outer surfaces and being supported by and extending circumferentially in opposite directions from each of said reinforcing ribs.

29. A piston wherein parts of the skirt wall adjacent to the head end thereof are resilient and other of said parts are relatively rigid and said resilient parts provide extended cylinder engaging surfaces separated circumferentially by less extended surfaces of said relatively rigid parts, and portions of the skirt wall adjacent to the open end thereof are of substantially elliptical cross-sectional contour and provide extended cylinder engaging surfaces in the median plane of the thrust axis of the piston which are continuous with cylinder engaging surfaces provided by some of said resilient parts.

30. A piston comprising a head and a skirt appendant thereto, said head having relatively rigid wrist pin bosses positioned within said skirt and extending toward the open end thereof, said bosses being spaced laterally from inner surfaces of resilient wall portions of said skirt adjacent to said bosses, spring means interposed between said bosses and said resilient wall portions and arranged and adapted to bias said resilient wall portions outwardly in the direction of the transverse axis of the piston, and separate wall biasing means arranged in and engaging open end portions of the skirt and arranged and adapted to bias oppositely disposed parts thereof outwardly in the direction of the thrust axis of the piston.

31. A piston comprising a head and a skirt appendant thereto, said head having relatively rigid wrist pin bosses positioned within said skirt and extending toward the open end thereof, said bosses being spaced laterally from inner surfaces of resilient wall portions of said skirt adjacent to said bosses, spring means interposed between said bosses and said resilient wall portions and arranged and adapted to bias said resilient wall portions outwardly in the direction of the transverse axis of the piston, and separate wall biasing means arranged in and engaging open end portions of the skirt and arranged and adapted to bias oppositely disposed parts thereof outwardly in the direction of the thrust axis of the piston, and means arranged and adapted to secure said separate wall biasing means to end portions of the skirt wall and means for varying the biasing effect thereof.

DAVID BUSHBY.

REFERENCES CITED

The following references are of record in the file of this patent:

UNITED STATES PATENTS

| Number | Name | Date |
|---|---|---|
| 664,401 | Good | Dec. 25, 1900 |
| 1,388,279 | Marien | Aug. 23, 1921 |
| 1,631,952 | Long | June 27, 1927 |
| 1,683,380 | Brockmeyer | Sept. 4, 1928 |
| 1,760,451 | Thomas | May 27, 1930 |
| 1,795,353 | Taylor | Mar. 10, 1931 |
| 1,881,214 | Melidoni | Oct. 4, 1932 |
| 1,984,266 | Hibasco | Dec. 11, 1934 |
| 2,026,098 | Palmer | Dec. 31, 1935 |
| 2,078,033 | Six | Apr. 20, 1937 |
| 2,119,137 | Moore | May 31, 1938 |
| 2,186,375 | Flaming | Jan. 9, 1940 |
| 2,210,310 | Teetor | Aug. 6, 1940 |
| 2,240,967 | Venner | May 6, 1941 |
| 2,240,968 | Venner | May 6, 1941 |
| 2,265,616 | Ulrich | Dec. 9, 1941 |
| 2,294,810 | Solenberger | Sept. 1, 1942 |
| 2,311,584 | Swift | Feb. 16, 1943 |